United States Patent Office 3,418,336
Patented Dec. 24, 1968

3,418,336
gem - CYCLOHEXANE - 1,1 - DIACETIC AND-
1-CARBOXY-1-ACETIC ACIDS AND THEIR
ANHYDRIDES
Charles H. Grogan, Falls Church, Va., and Leonard M.
Rice, Baltimore, Md., assignors to Tri-Kem Corporation, Washington, D.C., a corporation of District of
Columbia
No Drawing. Filed Apr. 2, 1965, Ser. No. 445,259
6 Claims. (Cl. 260—345.9)

ABSTRACT OF THE DISCLOSURE

The disclosure of the present application is directed to novel gem-cyclohexane - 1,1 - diacetic and -1-carboxy-1-acetic acids and their corresponding anhydrides of the formulae:

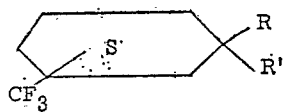

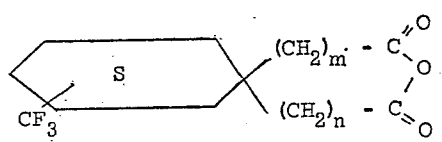

In formula I, R and R' can be either —$CH_2COOH$ or —COOH, but at least one of them must be —$CH_2COOH$. In formula II, $m$ and $n$ are 0–1, with at least one of $m$ and $n$ being 1. The novel compounds of the present invention are valuable synthetic intermediates in the formation of trifluoromethylazaspiranes and trifluoromethylazaspirodiones and their N-substituted derivatives. The aforesaid diones have local anesthetic, antihistaminic, sedative, central nervous stimulant and depressant and hypotensive properties. The corresponding azaspiranes, when converted to their nontoxic acid addition salts, are useful as antihistamines, growth regulatory, hormonal, antihormonal, central nervous stimulant and depressant substances.

---

The present invention relates to novel organic compounds which are valuable synthetic intermediates and, more particularly, to novel gem-cyclohexane-1, 1-diacetic and -1-carboxy-1-acetic acids and their anhydrides.

It is a primary object of this invention to provide novel organic compounds valuable as synthetic intermediates in the preparation of pharmacologically active medicinal products.

It is a further object of this invention to provide such novel synthetic intermediates and methods for their preparation.

It is still another object of this invention to provide novel gem-cyclohexane-1, 1-diacetic and -1-carboxy-1-acetic acids, in which the cyclohexane ring is substituted by a trifluoromethyl group, and their corresponding anhydrides.

These and other objects of the instant application will become more apparent through reference to the ensuing description and appended claims.

The compounds of the present invention are set forth in Formulae 1 and 2:

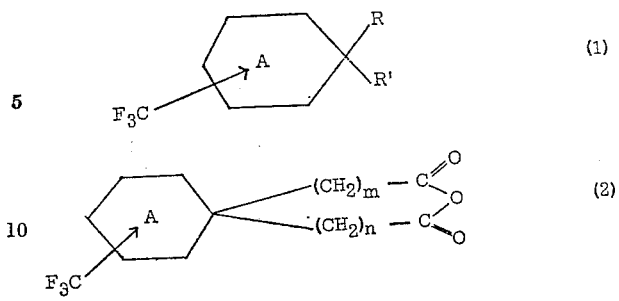

Formula 1 illustrates the gem diacids of the present invention; Formula 2 illustrates the anhydrides of the gem diacids of Formula 1. In these formulae, A is the cyclohexane ring and $F_3C$ is a trifluoromethyl group, which may be attached to any of the ring carbon atoms of ring A other than that to which R and R' are attached (in the case of Formula 1) or the spiro carbon atom (in the case of Formula 2). In Formula 1, R and R' can be either —$CH_2COOH$ or —COOH, but at least one of them must be —$CH_2COOH$. In Formula 2 $m$ and $n$ are 0–1, at least one of $m$ and $n$, however, being 1.

The novel acids of the present invention are valuable in obtaining trifluoromethylazaspiranes and trifluoromethylazaspirodiones and their N-substituted derivatives, as disclosed in applicant's copending application Ser. No. 445,246, filed on even date herewith and having the title "Trifluoromethylazaspiranes and Azaspirane Diones," whose disclosure is hereby incorporated herein by reference. Such trifluoromethylazaspirodiones and trifluoromethylazaspiranes have valuable pharmacological activity which render them useful as medicinal products. For example, the acids of this invention may be reacted with primary amines to form salts which, when heated in the range of about 140–240° C., cyclize to the corresponding diones (imides). These diones have local anesthetic, antihistaminic, sedative, central nervous stimulant and depressant and hypotensive properties. Reduction of the diones to their corresponding azaspiranes yields compounds which, when converted to their non-toxic acid addition salts, are useful as antihistamines, growth regulatory, central nervous stimulant and depressant substances. Certain of the bis-quaternary salts of these azaspiranes, as well as certain of the tertiary amines themselves, have potent hypotensive activity in the rat and the dog. Details of these useful applications are more fully set forth in said copending application.

The anhydrides of the novel acids of this invention may be used more efficaciously than the acids themselves in forming the diones (imides) of trifluoromethyl substituted azaspiranes. In fact, the anhydrides react more readily with a whole variety of primary amines to yield the corresponding amic acids which are readily cyclized to the corresponding diones (imides) by heating in the range of about 140–240° C. (See said copending application Ser. No. 445,246 for details of this procedure.) Said diones have the pharmacological activity stated above and may be reduced to free azaspirane bases which are identical with those obtained from the novel acids of Formula 1. The following illustrative examples will serve to illustrate compositions of matter coming within the scope of the claims of this invention and processes by which they may be obtained.

Example I.—3-trifluoromethylcyclohexane-1,1-diacetic
acid

A mixture of 50 gm. of 3-trifluoromethylcyclohexanone (this new ketone was obtained by catalytic hydrogenation of 3-trifluoromethyl phenol to a mixture of cis and trans isomers of 3-trifluoromethylcyclohexanol, which were oxidized to the ketone by the known dichromate-sulfuric acid method) and 75 gm. of ethyl cyanoacetate was placed in 200 ml. of 95% ethanol, previously saturated with anhydrous ammonia gas at 0° C., tightly stoppered and permitted to stand at 0–5° C. for one month. At the end of this period, little precipitate had been formed and 2.5 liters of either were added. After being permitted to stand overnight at 0–5° C., the precipitated ammonium salt of 1,5 - dicyano - 8 - trifluoromethyl - 3 - azaspiro[5.5]undecane-2,4-dione was removed by filtration and dissolved in a minimum of boiling water. On acidification with an equal volume of concentrated HCl, the free imide was obtained (22 gm., M.P. 244.5–245.5° C. on recrystallization from ethanol-water). The imide was dissolved in 60 ml. of concentrated sulfuric acid and allowed to stand overnight. Forty ml. of water were added and the mixture refluxed gently for eight hours. The brown-tan solution was cooled and diluted with an equal volume of water. After cooling overnight at 5° C., the title acid was removed by filtration (14.6 gm., M.P. 163–165° C. and 163–164° C. on recrystallization from water).

Example II.—3-trifluoromethylcyclohexane-1,1-diacetic acid anhydride

Refluxing 14 gm. of the acid of Example I with 50 ml. of acetic anhydride for four hours and removal of the acetic anhydride under reduced pressure gave a quantitative yield of the title anhydride which melted at 78–80° C. and 82–83° C. after recrystallization from ligroin.

Example III.—3-trifluoromethylcyclohexane-1-carboxy-1-acetic acid 76 gm. of 3-trifluoromethylcyclohexanone, 55 gm. of ethyl cyanoacetate and 1 ml. of piperidine were refluxed in an apparatus fitted with a water trap. When no more water was collected in the trap, the reaction mixture was diluted with several volumes of water containing 1 ml. of concentrated HCl. The mixture was extracted three times with 100 ml. portions of ether and the ether extracts washed with 10% sodium bicarbonate, 10% NaCl and dried over anhydrous sodium sulfate. The ether was stripped and the product distilled to give 86 gm. of ethyl-α-cyano-α-(3-trifluoromethylcyclohexylidene) acetate boiling at 128–132° C. at 1.2 mm. The ester just prepared was immediately dissolved in 200 ml. of 95% ethanol and a mixture of 40 gm. of potassium cyanide in 85 ml. of water added with stirring. The mixture was allowed to stand at room temperature for three days and all solvents removed under reduced pressure in a rotary evaporator. To the dried powder that remained was added 500 ml. of concentrated HCl and the mixture was refluxed for 24 hours. It was cooled, diluted with 200 ml. of water and kept overnight at 5° C. The precipitate cake was broken up and the solid filtered off. The residue was treated with an excess of boiling 20% potassium bicarbonate until effervescence ceased. 5 gm. of decolorizing carbon were added and the solution filtered. The light tan filtrate was concentrated to approximately 300 ml., neutralized with concentrated HCl and 200 ml. excess HCl added. After being permitted to stand overnight, the title acid was removed by filtration. After recrystallization from water or ethyl acetate-30–60°-petroleum ether, the white material melted at 149–150° C. Originally, there was obtained 56 gm. of a light tan material melting at 144–148° C.

Example IV.—3-trifluoromethylcyclohexane-1-carboxy-1-acetic acid anhydride

Refluxing the acid from Example III with 150 ml. of acetic anhydride for four hours, removal of the acetic anhydride under reduced pressure and distillation of the residue gave the title anhydride as a colorless or light straw colored viscous oil that boiled at 106–108° C. at 0.25 mm. 50 gm. of anhydride were obtained from 56 gm. of the acid.

Each of the foregoing four examples sets forth a compound in which the trifluoromethyl group is on the 3-position on the cyclohexane ring. It is within the contemplation of the present invention, however, to cover acids and anhydrides in which the trifluoromethyl group is substituted on other ring carbon atoms of the cyclohexane ring (other than the carbon atom to which R and R' are attached). Examples of such compounds are 2-trifluoromethylcyclohexane-1-carboxy-1-acetic acid and its anhydride, 4-trifluoromethylcyclohexane-1-carboxy-1-acetic acid and its anhydride and 4-trifluoromethylcyclohexane-1,1-diacetic acid and its anhydride.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. An acid of the formula:

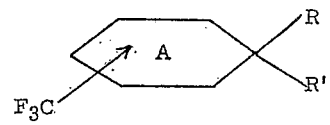

wherein A is a cyclohexane ring and R and R' are selected from the group consisting of —CH₂COOH and —COOH, at least one of R and R' being —CH₂COOH, the trifluoromethyl group being attached to a ring carbon atom of ring A other than the carbon atom to which R and R' are attached.

2. An anhydride of the formula:

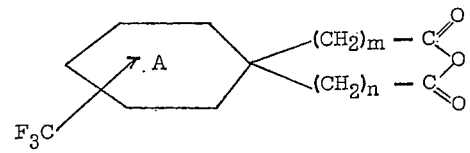

wherein A is a cyclohexane ring, m and n are 0–1, at least one of m and n being 1, the trifluoromethyl group being attached to a ring carbon atom of ring A other than the spiro carbon atom.

3. 3-trifluoromethylcyclohexane-1,1-diacetic acid.
4. 3-trifluoromethylcyclohexane-1,1-diacetic acid anhydride.
5. 3-trifluoromethylcyclohexane-1-carboxy-1-acetic acid.
6. 3-trifluoromethylcyclohexane-1-carboxy-1-acetic acid anhydride.

References Cited

UNITED STATES PATENTS
3,007,940  11/1961  Shavel et al. _____ 260—514

OTHER REFERENCES

Schener et al. Jour. Amer. Chem. Soc. vol. 80, pp. 4933–8 (1958) QD1.A5.

HENRY R. JILES, *Primary Examiner.*

J. M. FORD, *Assistant Examiner.*

U.S. Cl. X.R.

260—347.8, 514, 294.7, 326.5; 167—65, 52